United States Patent [19]

Mayernik et al.

[11] 3,771,762
[45] Nov. 13, 1973

[54] SAFELY DISCONNECTABLE FLOW LIMITER VALVES FOR A HIGH PRESSURE FLUID LINE

[75] Inventors: Andrew B. Mayernik; Edwin F. Beckwith; Howard N. Hubbard, all of McKeesport, Pa.

[73] Assignee: United States Steel Corporation, Pittsburgh, Pa.

[22] Filed: Oct. 13, 1972

[21] Appl. No.: 297,539

[52] U.S. Cl. ............................. 251/148, 251/149.3
[51] Int. Cl. ............................................ F16l 37/28
[58] Field of Search ................... 251/149.1, 149.3, 251/148; 137/231, 614.05; 285/190, 306; 137/517

[56] References Cited
UNITED STATES PATENTS

| 2,873,941 | 2/1959 | Kortchmar | 251/148 |
| 2,950,895 | 8/1960 | Anderson | 251/148 |
| 3,693,652 | 9/1972 | Iung | 137/517 |

FOREIGN PATENTS OR APPLICATIONS

| 593,542 | 5/1925 | France | 251/149.3 |

Primary Examiner—William R. Cline
Attorney—Donald S. Ferito

[57] ABSTRACT

Device includes an elongated bored main body having a pressure fluid inlet at one end, a closed opposite end, and a branch conduit projecting from one side thereof. An extension closed at its end extends from the branch conduit into the main body spanning the bore thereof. A poppet valve is disposed in the bore of the main body with its stem abutting the extension on the side thereof toward the fluid inlet end of the main body. Abutment of the stem and the extension keeps the poppet valve open to permit fluid flow from the inlet end of the main body to the extension. The extension is provided with deformable peripheral gaskets adjacent each end whereby the gaskets are deformed by high pressure fluid flow to retain the branch conduit connected with the main body. A plurality of pairs of opposed radial holes is provided along the length of the extension disposed in the bore of the main body whereby a balance of fluid pressure surrounding the extension is maintained so that the branch conduit can be safely and quickly disconnected from the main body under high fluid pressure.

1 Claim, 3 Drawing Figures

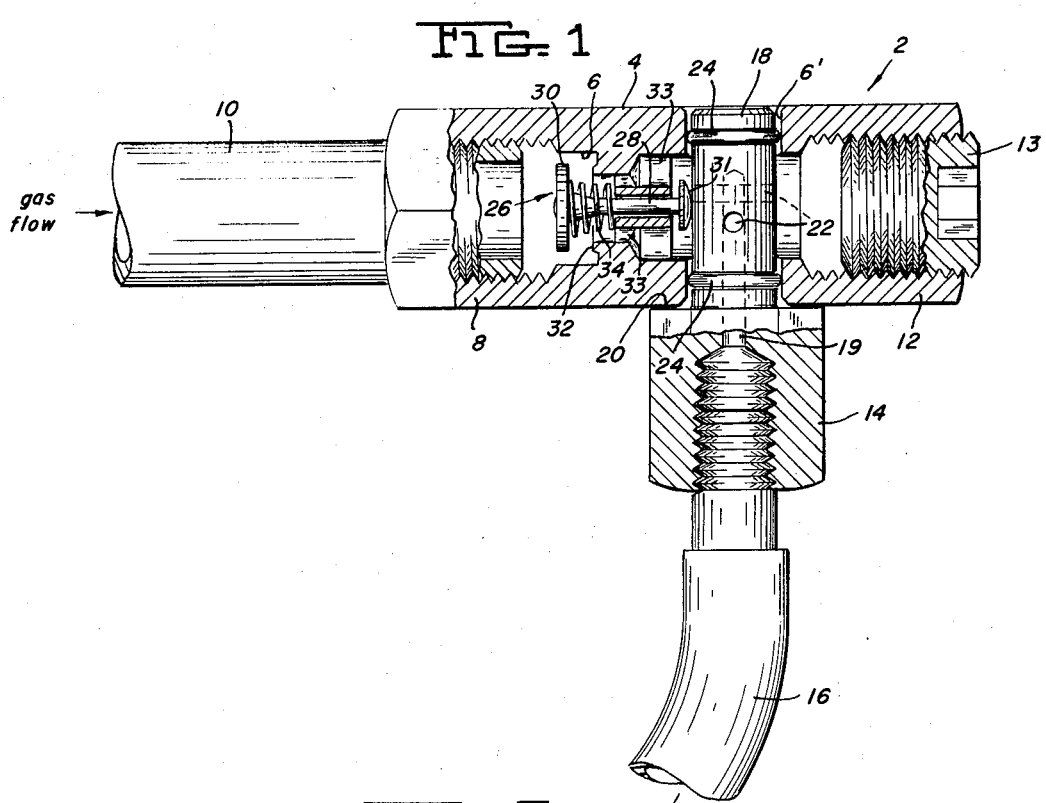
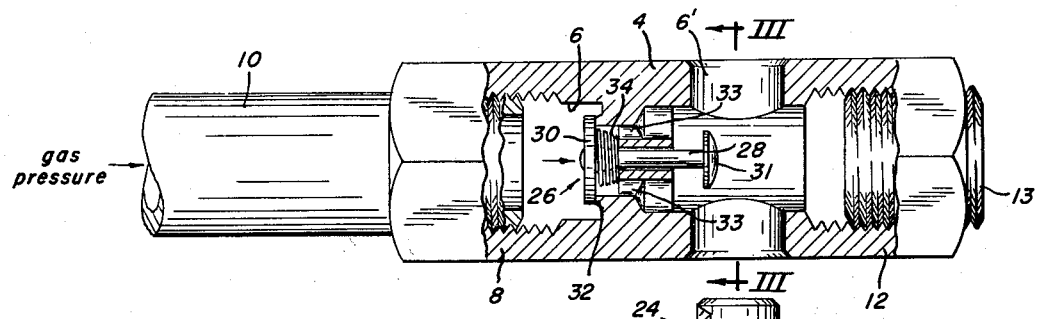
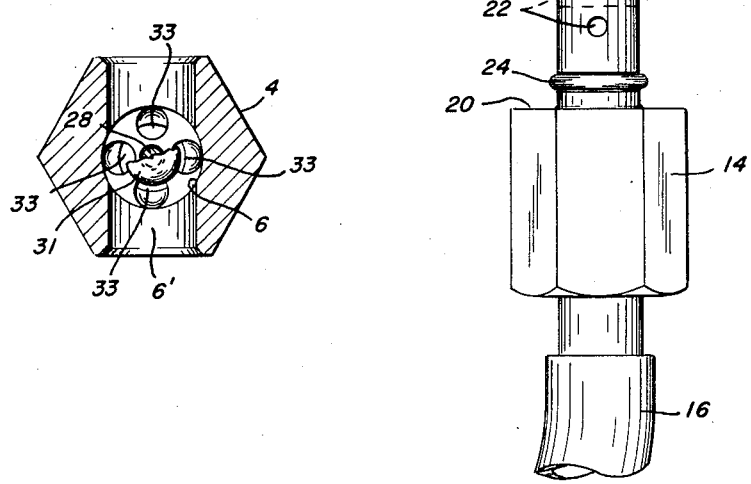

SAFELY DISCONNECTABLE FLOW LIMITER VALVES FOR A HIGH PRESSURE FLUID LINE

The present invention relates generally to fluid flow control means and more particularly to a flow limiter valve which is especially adapted to be safely and quickly disconnected from a high pressure fluid flow line.

Although not limited thereto, the device of our invention is especially suitable for use in conjunction with the tank-filling hose of a pressurized gas fuel system and, therefore, this invention will be described in such use.

Prior to our invention, considerable difficulty was encountered and serious hazards arose when the tank-filling hose of a pressurized gas fuel system was inadvertently broken, as for example, when a vehicle whose fuel tank was being filled under pressure, which could range from 2,250 and 3,500 or more pounds per square inch, pulled away from the filling apparatus before the hose was disconnected from the vehicle fuel tank and the fluid fuel was continuing to flow through the hose at the aforementioned high pressure. When this happened, the broken hose would whip around and possibly injure workmen in the vicinity of the filling apparatus as well as the driver of the vehicle. At the same time a great amount of the fluid fuel would be expelled and constitute an explosion hazard. The escaping gas would also bring about an economic loss.

In an effort to overcome the difficulty discussed above, quck-disconnect devices were used to connect the hose to the inlet of the vehicle fuel tank. However, all of these prior art quick-disconnect devices of which we are aware depended upon various combinations of mechanical pre-loaded latch means to secure them to the tank inlet. When used with a high pressure fuel hose, the mechanical latch means of the quick-disconnect devices were actually augmented by the high pressure of the fuel so that the hose would break before the device would disconnect. Another disadvantage inherent in prior art quick-disconnect devices was that the components thereof had to be substantially aligned to effect a quick-disconnect in an emergency.

Accordingly, it is the primary object of our invention to provide a safe and quickly disconnectable device for attaching a pressure fluid fuel supply means to a pressure fluid fuel use system.

As a corollary to the above, it is another object of our invention to provide an attaching device as set forth above which includes as a component thereof a flow control valve.

It is a more specific object of our invention to provide a safely disconnectable flow limiter valve for a high pressure fluid line which includes an elongated bored main body having a pressure fluid inlet at one end, a closed opposite end, and a branch conduit projecting from one side thereof. An extension closed at its end extends from a shoulder on the branch conduit into the main body spanning the bore of the main body; a poppet valve is disposed in the bore with its stem abutting the extension on the side thereof toward the fluid inlet end of the main body. Abutment of the stem and extension keep the poppet valve open to permit fluid flow from the inlet end of the main body to the extension. Deformable peripheral gaskets surround the extension adjacent each end thereof, which gaskets are deformable by the high pressure fluid flow passing through the main body bore to thus retain the branch conduit connected with the main body. A plurality of pairs of opposed radial holes is provided along the length of the extension whereby a balance of fluid pressure surrounding the extension is maintained so that the branch conduit can be safely and quickly disconnected from the main body while highly pressurized fluid is traveling through the bore of the main body.

These and other objects will become more apparent after referring to the following specification and attached drawing, in which:

FIG. 1 is an elevational view partly in section showing the device of the invention connecting a supply source with a fuel tank-filling hose;

FIG. 2 is a view similar to FIG. 1 but showing the fuel tank-filling hose disconnected from the device of the invention; and FIG. 3 is a cross-sectional view taken substantially along the line III—III of FIG. 2.

Referring more particularly to the drawing, reference character 2 designates generally the device of our invention including an elongated main body 4 with a bore 6 therethrough formed with an internally threaded inlet end 8 for threadingly receiving a pressurized fluid fuel supply pipe 10. The opposite end 12 of the bore 6 is closed. Such closure may be in the form of a removable plug 13 to facilitate assembly of the device.

A bored branch conduit 14 projects from one side of the main body 4 and is threadingly connected at its free end with a hose 16 which in turn is connected to the inlet (not shown) of a fuel tank of a vehicle (not shown). An extension 18 of the branch conduit 14 extends into and spans the bore 6 of the main body 4. A gas passageway 19 is formed in the extension 18, as best shown in FIG. 1. The extension 18 is of reduced cross section so as to form a shoulder 20 on the branch conduit which abuts the outer surface of the main body 4 so as to control the distance the extension 18 projects into the bore of the main body. The extension is of sufficient length to span the bore 6 for a purpose which will become apparent. The main body 4 is formed with a bore 6' which extends normal to the bore 6 and receives the extension 18.

The extension 18 is provided with a plurality of spaced pairs of opposed radial holes 22 in order to achieve a balanced pressure condition on each side of the extension. A deformable gasket 24 which may be made of rubber or similar material surrounds the extension 18 adjacent each end thereof. The gaskets 24 are normally deformed while high pressure fluid fuel flows through the bore 6, and serve to retain the branch conduit 14 in connection with the main body 4. The gaskets 24 may be mounted in grooves in the extension 18 or in grooves (not shown) formed in the wall of the bore 6' as desired.

A poppet valve, designated generally by reference character 26, is disposed in the bore 6 between the inlet end 8 of the main body 4 and the bore 6'. The stem 28 of the valve 26 is formed with an enlarged head 30 at one end which is adapted to engage a valve seat 32 to stop the flow fluid through the device of the invention. A relatively smaller head 31 is formed on the opposite end of the stem 28. A compression spring 34 surrounds the stem 28 and urges the head 30 thereof away from the seat 32 to keep the valve open. The poppet valve 26 is normally positively kept open by abutment of the head 31 of the stem 28 against the extension 18. When the poppet valve is open, gas flows through counterbored openings 33 which are formed in the seat 32 to the extension 18.

In operation, pressurized gas fuel is introduced into the inlet end 8 of the bore 6 through the pipe 10. As indicated by arrows, the gas flows through the open poppet valve 26, the radial holes 22, into the extension 18, through branch conduit 14 into hose 16 which leads to the inlet (not shown) of the fuel tank of a vehicle (not shown). Normally the gas flowing through the device is at a pressure ranging from 2,250 to 3,500 psi or more.

In the event the vehicle to which the hose 16 is attached pulls away before the hose is disconnected from the vehicle fuel tank, the branch conduit 14 quickly disengages from the main body 4 and the poppet valve 26 closes to seal off the flow of the gas fuel. The gas remaining in the hose 16 is dissipated through the radial holes 22 of the extension 18. A check valve (not shown) in the inlet of the vehicle fuel tank prevents back-flow of gas out of the vehicle tank.

It will be noted that when the extension 18 is withdrawn from the main body 4, the poppet valve 26 automatically closes under pressure of the fluid entering the inlet end of the main body 4, as best shown in FIG. 2. This constitutes an additional safety feature since the gas pressure keeping the poppet valve closed must be removed before the extension 18 may be reinserted into the main body 4. Relieving the poppet valve from the pressure of the incoming gas flow is necessary to allow the spring 34 to open the valve and remove the end of the stem 28 from the path of entry of the extension 18.

While we have shown but one embodiment of our invention, other adaptations and modifications may be made without departing from the scope of the following claim.

We claim:

1. In apparatus for conducting fluid under pressure from a fluid supply source to a receiver including a conduit fixedly connected by one end to said supply source and detachably connected by its other end to said receiver, the improvement therewith of a flow limiting valve adapted to be readily disconnected under pressure attached to said other end of said conduit and to said receiver, one valve comprising an elongated main body having a longitudinal bore therethrough and a bore normal to said longitudinal bore, one end of said main body being connected with said other end of said conduit and its other end being closed, a branch conduit projecting from the side of said main body intermediate the ends thereof, said branch conduit being adapted to be connected with said receiver, said branch conduit having a bore therethrough communicating with the bore in said main body, said branch conduit having a bored extension of reduced cross section extending inwardly of said main body in said bore of said main body normal to the longitudinal bore of said main body spanning said longitudinal bore when said branch conduit is connected with said main body, the end of said extension disposed inwardly of said main body being closed, said extension having a plurality of pairs of opposed radial holes spaced along its length, a deformable gasket surrounding said extension adjacent each end thereof, said gaskets being adapted to be deformed under fluid pressure to retain said branch conduit connected with said main body, a spring-loaded poppet valve, said poppet valve having a stem shaped with an enlarged head at one end, said stem extending longitudinally of the bore of said main body and a seat engageable by the head of said stem to close said valve, spring means surrounding said stem and abutting said head at one end and said seat at its other end to constantly urge said valve into open position, said valve being disposed between the fluid inlet end of said bore in said main body and said bore in said main body normal to said longitudinal bore, the end of said stem opposite said head abutting said extension when said branch conduit is connected with said main body whereby said poppet valve is restrained from closing, and said valve is closed by fluid pressure when said extension is removed from said main body.

* * * * *